United States Patent
Onodera et al.

(10) Patent No.: US 7,032,382 B2
(45) Date of Patent: Apr. 25, 2006

(54) INTERNAL COMBUSTION ENGINE PROVIDED WITH INTAKE BYPASS CONTROL DEVICE

(75) Inventors: Yasuyuki Onodera, Oyama (JP); Toshihiko Nishiyama, Oyama (JP); Takumi Ito, Oyama (JP)

(73) Assignee: Komatsu Ltd., Tokyo (JP)

( * ) Notice: Subject to any disclaimer, the term of this patent is extended or adjusted under 35 U.S.C. 154(b) by 5 days.

(21) Appl. No.: 10/847,821

(22) Filed: May 17, 2004

(65) Prior Publication Data

US 2005/0160733 A1 Jul. 28, 2005

(30) Foreign Application Priority Data

May 20, 2003 (JP) ............................. 2003-142466

(51) Int. Cl.
*F02B 33/44* (2006.01)
*F02B 37/16* (2006.01)
*F02B 37/00* (2006.01)
*F02B 37/12* (2006.01)

(52) U.S. Cl. ......................................... 60/606; 60/611
(58) Field of Classification Search .................. 60/606, 60/611; F02B 37/16, 37/00; F02D 23/00
See application file for complete search history.

(56) References Cited

U.S. PATENT DOCUMENTS

| | | | | |
|---|---|---|---|---|
| 4,378,677 A | * | 4/1983 | Zumstein | 60/606 |
| 4,559,784 A | * | 12/1985 | Jenny et al. | 60/606 |
| 4,833,886 A | * | 5/1989 | Meier | 60/606 |
| 5,724,813 A | * | 3/1998 | Fenelon et al. | 60/606 |
| 6,912,852 B1 | * | 7/2005 | Gottemoller et al. | 60/606 |

FOREIGN PATENT DOCUMENTS

| | | | |
|---|---|---|---|
| DE | 3225867 A1 | * | 1/1984 |
| GB | 2003226 A | * | 3/1979 |
| JP | 03047439 A | * | 2/1991 |
| JP | 10169457 A | * | 6/1998 |
| JP | 2000064844 A | * | 2/2000 |
| JP | 2001-165000 A | | 6/2001 |
| JP | 2003065062 A | * | 3/2003 |

\* cited by examiner

*Primary Examiner*—Thai-Ba Trieu
(74) *Attorney, Agent, or Firm*—Frishauf, Holtz, Goodman & Chick, P.C.

(57) ABSTRACT

A bypass conduit (23) connects an outlet passage of a compressor (21) of an exhaust gas turbocharger (20) and an inlet passage of an exhaust turbine (22), and a bypass valve (24) is provided therein. When the operating condition of a diesel engine (1) is found to be in a low-speed and high-load region, the bypass valve (24) is controlled by means of a valve controller to adjust the bypass conduit (23) so as to open it. Then, the charge air partly flows into an exhaust conduit (4) to increase the rotational speed of the exhaust turbine (22) and hence the charge air flow rate raises the output of the diesel engine (1). Additionally, as the charge air flow rate is increased, the operating condition of a compressor (21) is prevented from approaching the surging range.

8 Claims, 11 Drawing Sheets

INTERNAL COMBUSTION ENGINE PROVIDED WITH INTAKE BYPASS CONTROL DEVICE

BACKGROUND OF THE INVENTION

1. Field of the Invention

The present invention relates to an internal combustion engine provided with an intake bypass control device. More particularly, the present invention relates to an internal combustion engine provided with an exhaust gas turbocharger and an intake bypass control device adapted to drive a compressor by means of exhaust gas for intake air charging.

2. Description of the Related Art

Internal combustion engines such as gasoline engines and diesel engines that are provided with an exhaust gas turbocharger are known. The exhaust gas turbocharger revolves a turbine by utilizing the pressure of exhaust gas from the internal combustion engine and also drives a compressor by the torque of the turbine for intake air charging the internal combustion engine. Internal combustion engines provided with an exhaust gas turbocharger and also with a bypass circuit that allows the outlet passage of the compressor and the inlet passage of the turbine to connect with each other are also known (see, for example, Japanese Patent Laid-Open Publication No. 2001-165000, p 9–10, FIG. 1.)

Internal combustion engines provided with the bypass circuit are designed to efficiently driving an exhaust gas recirculation system of the engine, or EGR system. An EGR system reduces the oxygen concentration in the intake air by partly circulating the exhaust gas to the intake air of the internal combustion engine and lowers the combustion temperature of the internal combustion engine in order to suppress the generation of nitrogen oxides (NOx) in exhaust gas. Internal combustion engines provided with the EGR system are so designed that the emission rate of NOx is observed and exhaust gas recirculation is made to take place when the emission rate becomes higher than a predetermined level. If the intake pressure of the internal combustion engine is higher than the exhaust pressure and exhaust gas hardly flows to the intake side, the bypass circuit is opened to allow the intake air to partly flow into the exhaust passage and reduce the intake pressure in order to facilitate the recirculation of exhaust gas. With this control arrangement, it is possible to efficiently conduct the EGR.

Meanwhile, in the case of the engine of a construction machine such as a hydraulic power shovel, there are occasions where a high output is required in a low-speed operation (a high low-speed torque). When an exhaust gas turbocharger is combined with an engine that is used for a construction machine and a highly efficient operation point that is found at the smaller flow rate side relative to the choke flow rate of the compressor is used as rated point of the engine, the operation point of the compressor can be found near the surging range where the compressor operates unstably particularly when the compressor is driven to operate in a low-speed and high-load region.

Particularly, in the case of an engine that is provided with the EGR system as described above, the turbocharger is required to charge the engine with a high pressure ratio in order to secure a volume of intake air that matches the required output level because exhaust gas is partly fed back into the intake air to reduce the volume of intake air. However, a high pressure ratio turbocharger type compressor tends to reduce the region between the choke flow rate that is in the operable flow rate range and the surging flow rate when it is in operation. Thus, it is difficult to find an exhaust gas turbocharger that matches the engine.

The use of a wide range type compressor may be conceivable to avoid a combination of an engine and an exhaust gas turbocharger that make the operation point of the compressor approach the surging range in a low-speed and high-load region. However, wide range type compressors normally show a low pressure ratio and are not adapted to a high rotational speed. Therefore, a wide range type compressor is not suited for high pressure ratio supercharging.

SUMMARY OF THE INVENTION

An object of the present invention to provide an internal combustion engine that can avoid surging by means of a high pressure ratio and high rotational speed type compressor and obtain an excellent low-speed torque.

An internal combustion engine provided with an intake bypass control device according to the present invention, the engine has: a turbocharger having a compressor for taking in and pressurizing ambient air and supplying it into the internal combustion engine and an exhaust turbine for driving the compressor; a connecting passage for connecting an outlet passage of the compressor to an inlet passage of the exhaust turbine; a bypass valve arranged in the connecting passage; an operating condition detector for detecting the operating condition of the internal combustion engine; and a bypass valve opening controller adapted to open the bypass valve upon determining the operating condition of the internal combustion engine to be in a low-speed and high-load region in response to a signal from the operating condition detector.

With the above defined arrangement, the bypass valve opening controller controls and opens the bypass valve of the internal combustion engine in a low-speed and high-load region of operation of the internal combustion engine and hence the charge air partly flows into the inlet passage of the exhaust turbine without passing through the internal combustion engine. Thus, the restriction of the compressor system circuit changes and the operation point of the compressor moves to the large flow rate side when the internal combustion engine is operating at low speed. Additionally, the work of the exhaust turbine increases because the charge air partly flows into the inlet passage of the exhaust turbine so that consequently the rotational speed of the exhaust turbine increases. As a result, the operation point of the compressor is separated from the surging limit to a large extent to stabilize the operation of the compressor and increase the volume of air supplied to the internal combustion engine so as to consequently increase the low-speed torque.

Additionally, since the operating range of the compressor effectively avoids approaching the surging range within the designed scope of operation of the internal combustion engine, it is possible to adopt a high pressure ratio and high rotational speed type compressor to provide an enhanced degree of freedom for selecting/designing the compressor relative to the designed scope of operation of the internal combustion engine.

The bypass valve may be a two-position, or so called ON-OFF, control type valve that is adapted to completely open or completely close the connecting passage, a three-position control type valve that is adapted to completely open, completely close or half open the connecting passage or a multi-position type valve that is adapted to adjust the opening degree of the connecting passage continuously or in four or more than four steps.

Preferably, in the internal combustion engine provided with an intake bypass control device according to the present invention, the bypass valve is so adapted as to be able to adjust its valve opening.

With this arrangement, since the bypass valve is so adapted as to be able to adjust its valve opening, it can be controlled to show the smallest necessary opening degree in response to the operating condition of the internal combustion engine. As a result, the flow rate of the charge air flowing into the connecting passage is minimized to increase that of the charge air flowing into the internal combustion engine. When, for example, different output levels are specified for the same internal combustion engine, they can be accommodated flexibly by specifying the respective opening degrees of the bypass valve depending on the required respective low-speed torques.

Preferably, in the internal combustion engine provided with an intake bypass control device according to the present invention, the operating condition detector is a turbocharger operating condition detector adapted to detect the operating condition of the turbocharger and the bypass valve opening controller is adapted to open the bypass valve upon determining the operating condition of the compressor to be in the vicinity of the surging range in response to a signal from the turbocharger operating condition detector.

With this arrangement, the turbocharger operating condition detector detects the operating condition of the compressor and, when the operating condition of the compressor is found in the vicinity of the surging range, the bypass valve opening controller controls and opens the bypass valve. As a result, the charge air flow rate of the compressor is raised and the operating condition of the compressor is moved away from the surging range to stabilize the operation of the compressor.

Additionally, since the bypass valve opening controller monitors the detected values from the turbocharger operating condition detector, hence the operating condition of the compressor is directly monitored so that the operating condition of the compressor is reliably moved away from the surging range unlike the arrangement where the operating condition of the compressor is estimated on the basis of the operating condition of the internal combustion engine.

Preferably, in the internal combustion engine provided with an intake bypass control device according to the present invention, the operating condition detector includes a fuel injection volume detector for detecting the volume of fuel injected into the internal combustion engine and an internal combustion engine speed detector for detecting the internal combustion engine speed and the bypass valve opening controller is adapted to open the bypass valve upon determining the operating condition of the internal combustion engine to be in a low-speed and high-load region or the operating condition of the compressor to be in the vicinity of the surging range based on the fuel injection volume detected by the fuel injection volume detector and the internal combustion engine speed detected by the internal combustion engine speed detector.

With this arrangement, the operating condition of the internal combustion engine is grasped on the basis of the fuel injection volume and the internal combustion engine speed so that, when the detected values are determined to be found within a range corresponding to the predefined range of operating condition and hence the operating condition of the internal combustion engine is determined to be in a low-speed and high-load region or when the operating condition of the compressor is found in the vicinity of the surging range, the bypass valve opening controller controls and opens the bypass valve. Then, the charge air of the compressor partly flows into the inlet passage of the exhaust turbine to increase the rotational speed of the exhaust turbine and hence the flow rate of the compressor. Then, the low-speed torque of the internal combustion engine is raised to effectively prevent the operating condition of the compressor from approaching the surging range.

Since the fuel injection volume and the internal combustion engine speed are detection parameters to be normally used for controlling the operation of the internal combustion engine, the operating condition of the internal combustion engine can be detected with ease by utilizing these detected values. Therefore, the intake bypass control device can be configured without providing an additional detector.

Preferably, in the internal combustion engine provided with an intake bypass control device according to the present invention, the operating condition detector includes a charge pressure detector for detecting the charge pressure of the turbocharger and a charge air flow rate detector for detecting the charge air flow rate of the turbocharger and the bypass valve opening controller is adapted to open the bypass valve upon determining the operating condition of the internal combustion engine to be in a low-speed and high-load region or the operating condition of the compressor to be in the vicinity of the surging range based on the charge pressure detected by the charge pressure detector and the charge air flow rate detected by the charge air flow rate detector.

With this arrangement, the operating condition of the compressor is grasped on the basis of the charge pressure and the charge air flow rate of the compressor so that the operating condition of the compressor is reliably prevented from approaching the surging range by directly monitoring the operating condition of the compressor, using the detected values, and controlling the bypass valve. Therefore, the operation of the compressor is stabilized.

Preferably, in the internal combustion engine provided with an intake bypass control device according to the present invention, the operating condition detector includes a turbocharger rotational speed detector for detecting the rotational speed of the turbocharger and a charge air flow rate detector for detecting the charge air flow rate of the turbocharger and the bypass valve opening controller is adapted to open the bypass valve upon determining the operating condition of the internal combustion engine to be in a low-speed and high-load region or the operating condition of the compressor to be in the vicinity of the surging range base on the turbocharger rotational speed detected by the turbocharger rotational speed detector and the charge air flow rate detected by the charge air flow rate detector.

With this arrangement, the operating condition of the compressor is grasped on the basis of the rotational speed of the turbocharger and the charge air flow rate of the turbocharger so that the operating condition of the compressor is reliably prevented from approaching the surging range by directly monitoring the operating condition of the compressor, using the detected values, and controlling the bypass valve. Therefore, the operation of the compressor is stabilized.

DETAILED DESCRIPTION OF THE PREFERRED EMBODIMENTS

Now, embodiments of the present invention will be described by referring to the accompanying drawings. Throughout the drawings and the description that follow, the components that are same or similar to each other are denoted respectively by the same reference symbols and will not be described repeatedly.

[1st Embodiment]

Figure 1:
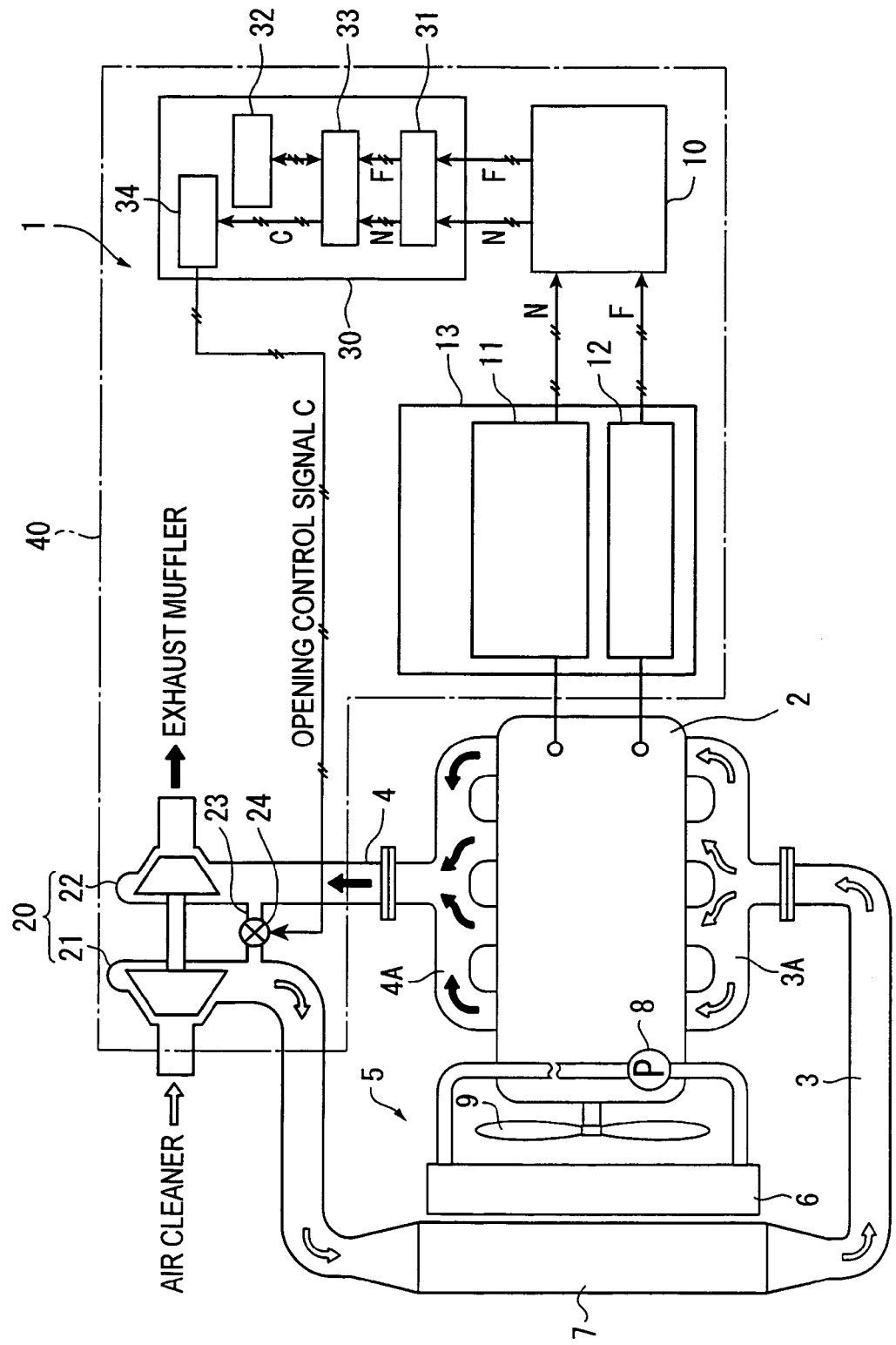
FIG. 1 is a schematic illustration of an internal combustion engine system according to a first embodiment of the present invention.

FIG. 1 is a schematic illustration of the system of a diesel engine (internal combustion engine) 1 to which the first embodiment is applied. Referring to FIG. 1, the diesel engine 1 has an engine main body 2 containing a plurality of combustion chambers (four in this embodiment) that are formed in the inside, an intake conduit 3 for supplying air to the combustion chambers, an exhaust conduit 4 for delivering exhaust gas to the outside of the combustion chambers, a cooling mechanism 5 for cooling the diesel engine 1, an engine controller 10 for controlling the operation of the engine main body 2 and an exhaust gas turbocharger (turbocharger) 20 adapted to compress the charge air for the purpose of supercharging the engine main body 2.

An intake manifold 3A is arranged between the intake conduit 3 and the engine main body 2 in order to distribute the air supplied from the intake conduit 3 among the combustion chambers. An exhaust manifold 4A is arranged between the engine main body 2 and the exhaust conduit 4 in order to collectively lead the exhaust from the combustion chambers into the exhaust conduit 4.

The cooling mechanism 5 has a pump 8 that is driven by a crankshaft (not shown) and the like housed in the engine main body 2 so that the cooling water fed by the pump 8 cools the components that need to be cooled, including the engine main body 2 of the diesel engine 1, the exhaust gas turbocharger 20, an oil cooler (not shown) and the like, and is subsequently cooled back by a radiator 6 arranged in the cooling mechanism 5. An after-cooler 7 is arranged midway of the intake conduit 3 for the purpose of cooling the air compressed by the exhaust gas turbocharger 20.

The radiator 6 and the after-cooler 7 are arranged on the engine main body 2 and both the effect of cooling the radiator 6 and that of cooling the after-cooler 7 are accelerated by a fan 9 that is driven to revolve typically by the crankshaft.

The engine controller 10 is connected to a detector (operating condition detector) 13 including an engine speed detector (internal combustion engine speed detector) 11 and a fuel injection volume detector 12 for detecting the volume of fuel injected into the combustion chambers and adapted to receive a detection signal on the engine speed N and a detection signal on the fuel injection volume F from the detector 13. The engine controller 10 grasps the operating condition of the diesel engine 1 on the basis of the detection signals and controls the volume of fuel to be injected into the combustion chambers and also the timing of injecting fuel into the combustion chambers.

The engine speed detector 11 may be adapted to detect the rotational speed of the crankshaft of the engine main body 2 or the like, whereas the fuel injection volume detector 12 may be adapted to detect the fuel injection volume or the like by detecting the position of a governor of the fuel injection pump or, if a common-rail is installed, by detecting the fuel pressure as gauged at the common-rail or the time period during which a solenoid valve of the fuel injection nozzle is opened.

The exhaust gas turbocharger 20 includes an exhaust turbine 22 arranged midway of the exhaust conduit 4 and a compressor 21 arranged midway of the intake conduit 3 and linked to the exhaust turbine 22. The outlet passage of the compressor 21 arranged midway of the intake conduit 3 and the inlet passage of the exhaust turbine 22 arranged midway of the exhaust conduit 4 are connected to each other through a bypass conduit (connecting passage) 23, and this bypass conduit 23 is provided with a bypass valve 24 for adjusting the opening of the bypass conduit 23. A needle valve, a butterfly valve, a solenoid valve or some other appropriate valves may be used for the bypass valve 24. In this embodiment, a two-position control valve that keeps the bypass conduit 23 selectively either in a completely open state or in a completely closed state is adopted for the bypass valve 24.

A valve controller (bypass valve opening controller) 30 for controlling the operation of the bypass valve 24 is connected to the bypass valve 24.

In this embodiment, an intake control device (intake bypass control device) 40 according to the invention has the exhaust gas turbocharger 20, the bypass conduit 23, the bypass valve 24, the detector 13 and the valve controller 30. The intake control device 40 of this embodiment additionally includes the engine controller 10 because the valve controller 30 is connected to the detector 13 through the engine controller 10.

The valve controller 30 is connected to the engine controller 10 and can receive a detection signal on the engine speed N and a detection signal on the fuel injection volume F from the engine controller 10.

The valve controller 30 has an input section 31 for receiving each detection signal from the engine controller 10, a memory section 32 storing optimal opening degree of the bypass valve 24 that correspond to various input signals from the input section 31 as a map or table, a control section 33 adapted to determine the optimal opening degree of the bypass valve 24 on the basis of the information stored in the memory section 32 and an output section 34 for outputting an opening adjusting command (opening control signal C) from the control section 33.

Figure 2:
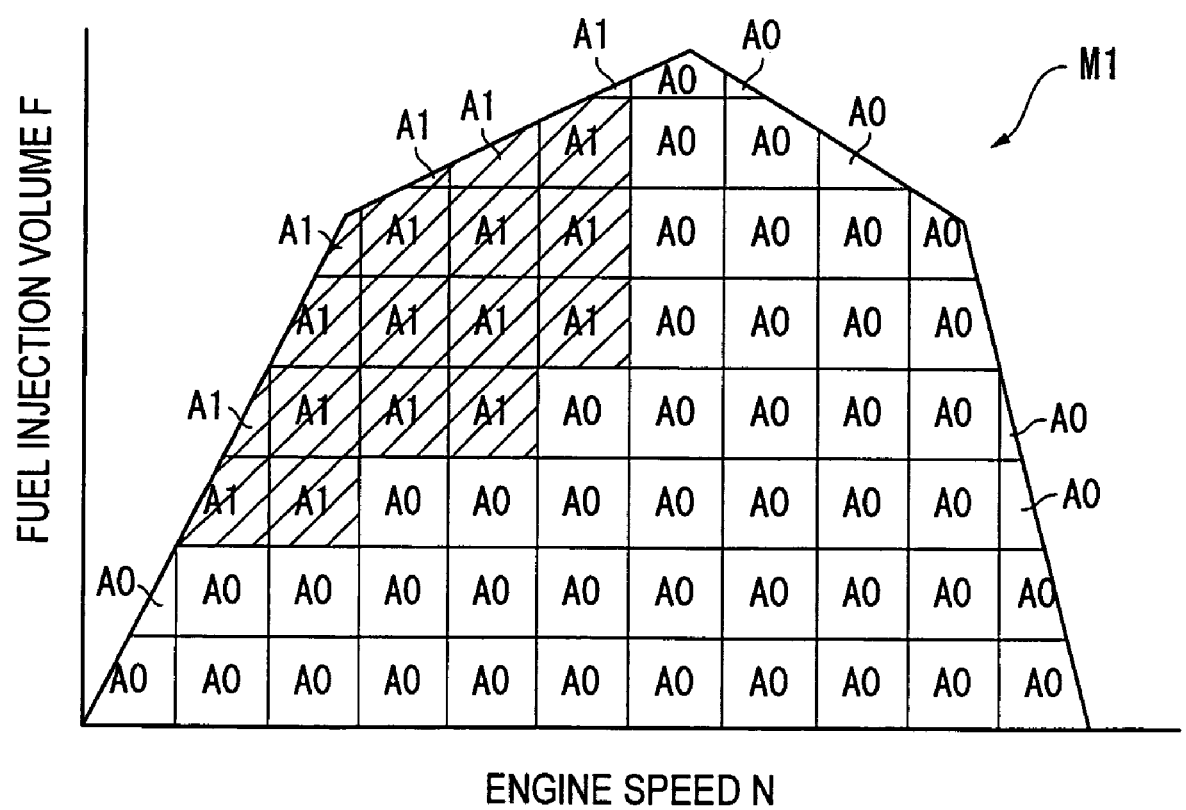
FIG. 2 is a schematic illustration of a map of a memory section of a bypass valve opening controller according to the first embodiment of the invention.

As shown in FIG. 2, the memory section 32 stores a map M1 showing opening degree A of the bypass valve 24 that reflects the operating condition of the diesel engine 1. The map M1 is formed by using a horizontal axis that represents the engine speed N and a vertical axis that represents the fuel injection volume F and defines the opening degree A of the bypass valve 24 and the time period T during which the opening degree A is maintained as a function of the operating condition of the diesel engine 1.

In this embodiment, the opening degree A is either A1, which represents 100% (completely open) and is selected in a low-speed and high-load region of the operating condition of the diesel engine 1 or A0, which represents 0% (completely closed) and is selected in all other regions of the operating condition of the diesel engine 1. In other words, referring to FIG. 2, the opening degree A1 is selected in a region (shaded region in FIG. 2) of the operating condition where the engine speed N is relatively low and the fuel injection volume F is relatively high and the opening degree A0 is selected in all other regions. The time period during which the opening degree A1 is maintained is defined in advance to be equal to a predetermined value of T1.

The low-speed and high-load region is defined appropriately by taking the performance and the operating range of the diesel engine 1 and those of the exhaust gas turbocharger 20 into consideration. For example, when no supercharge takes place and the low-speed torque does not rise in a low-speed region, a higher low-speed torque may be needed. The operating range of the compressor 21 may approach the surging range when a load is applied to the compressor 21 by the diesel engine 1. The low-speed and high-load region is defined appropriately by taking these factors into consideration.

The diesel engine 1 having the above-described configuration operates in a manner as described below.

When the diesel engine 1 is in operation, the exhaust gas turbocharger 20 drives the exhaust turbine 22 by exhaust gas and also drives the compressor 21 so as to supercharge the engine main body 2. The engine controller 10 grasps the operating condition of the engine main body 2 on the basis of the signals representing the engine speed N and the fuel injection volume F of the engine main body 2 so as to control the volume of fuel to be injected and also the timing of injecting fuel into the combustion chambers and transmit detection signals representing the engine speed N and the fuel injection volume F of the engine to the valve controller 30.

Figure 3:
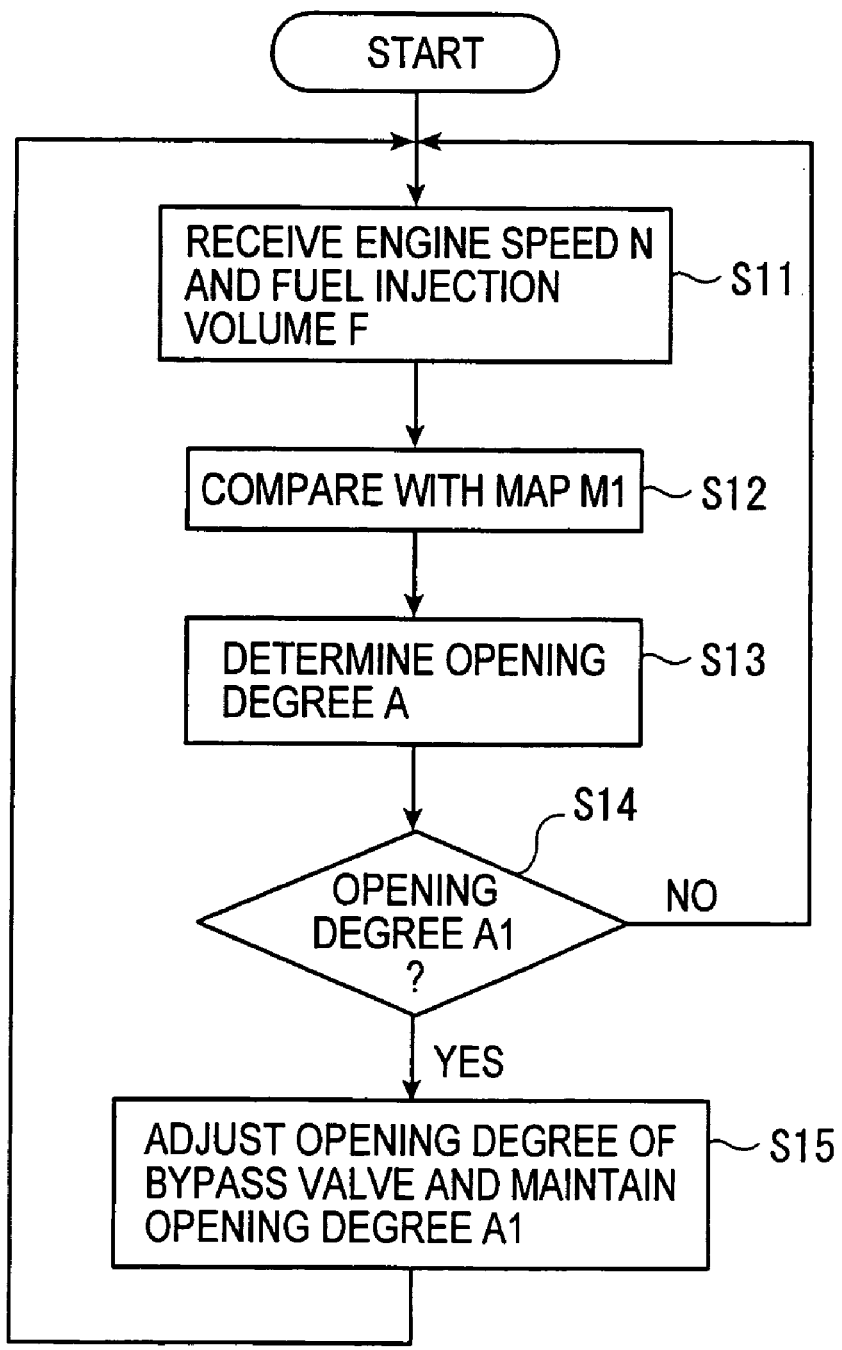
FIG. 3 is a flow chart of the operation of an intake bypass control device according to the first embodiment of the invention.

Referring to the flow chart of FIG. 3, the valve controller 30 firstly receives the detection signals representing the engine speed N and the fuel injection volume F of the engine by the input section 31 in the Step 11 (S11). Then, the controller section 33 compares the detected values with the map M1 in the memory section 32 in the S12 and determines the opening degree A of the bypass valve 24 in the S13. Then, in the S14, the control section 33 outputs an opening control signal C that corresponds to the opening degree A determined in the S13 to the output section 34. More specifically, the control section 33 outputs a completely open signal when the opening degree A is A1, whereas it outputs a completely closed signal when the opening degree A is A0. If it is determined in the S14 that the opening degree A as determined in the S13 is A1, the control section 33 proceeds to S15, where the output section 34 outputs an completely open signal to the bypass valve 24, which completely opens the bypass conduit 23 and maintains the opening degree A1 for the predetermined time period T1.

As the bypass conduit 23 is completely opened, the charge air partly flows into the exhaust conduit 4 through the bypass conduit 23 to raise the exhaust pressure. As the exhaust pressure rises, the rotational speed of the exhaust turbine 22 rises to drive the compressor 21 to revolve so that consequently the charge air flow rate of the compressor 21 is increased to boost the low-speed torque of the diesel engine 1.

The bypass valve 24 completely opens the bypass conduit 23 for the predetermined time period T1 and then completely closes the bypass conduit 23. Thereafter, the valve controller 30 returns to the S11 and repeats the above sequence of operation for controlling the bypass valve 24.

If, on the other hand, it is determined in the S14 that the opening degree A as determined in the S13 is A0, the output section 34 outputs a completely closed signal to the bypass valve 24 to keep the bypass valve 24 in a completely closed state.

In this way, in a low-speed and low-load region where A0 is selected for the opening degree A of the bypass valve 24, it is not necessary to drive the exhaust turbine 22 at a high rotational speed because of the low load. In a high speed region, to the contrary, it is possible to secure a normally required pressure level and hence drive the compressor 21 to operate excellently by driving the exhaust turbine 22 at a high rotational speed by the exhaust pressure if the bypass conduit 23 is completely closed so that the engine main body 2 can maintain the necessary low-speed torque.

When the opening degree A is A0, or completely closed, it is not necessary for the output section 34 to output a completely closed signal. In other words, the valve controller 30 may be so adapted as to output an opening control signal C by the output section 34 only when the A1, or a completely open state, needs to be selected for the opening degree A, while the bypass valve 24 may be so adapted as to completely open the bypass conduit 23 when it receives an opening control signal C.

The diesel engine 1 provided with the intake control device 40 as described above provides the following advantages.

(1) Since the bypass conduit 23 that connects the outlet passage of the compressor 21 to the inlet passage of the exhaust turbine 22 and the bypass valve 24 is completely opened for a predetermined time period of T1 when the operating condition of the diesel engine 1 is in a low-speed and high-load region, the charge air partly flows into the exhaust conduit 4 in that time period to raise the exhaust pressure and increase the charge air flow rate of the compressor 21. Thus, it is possible to boost the low-speed torque of the engine main body 2.

(2) Since the charge air flow rate of the compressor 21 is increased as the bypass conduit 23 is completely opened in a low-speed and high-load region, it is possible to operate the compressor 21 in a good condition on a stable basis without allowing the operating range of the compressor 21 to approach the surging range. Inversely, it is possible to prevent the operating range of the compressor 21 from approaching the surging range by way of such a control technique to consequently broaden the operable range of the compressor 21. Then, the scope of applicability of a compressor 21 of the type under consideration to diesel engines 1 is broadened to improve the general purpose utility of the compressor 21.

(3) Since the detector 13 for detecting the operating condition of the diesel engine 1 takes in the detected values from the engine speed detector 11 and the fuel injection volume detector 12 that are necessary for the engine controller 10 to control the engine main body 2, it is not necessary to provide an additional detector for the valve controller 30. Therefore, the valve controller 30 can be made to have a simple configuration to reduce the cost of manufacturing the intake control device 40.

(4) Since a two-position control valve is used for the bypass valve 24 and the opening degree of the bypass conduit 23 is controlled so as to be completely open or completely closed, the operation of the valve controller 30 can be simplified to simplify the configuration of the control section 33.

Additionally, since a predetermined value of T1 is selected for the time period T during which the opening degree A of the bypass valve 24 is maintained to be completely open, the operation of controlling the opening of the bypass valve 24 can be further simplified.

Furthermore, since the memory section 32 is provided with a map M1 that stores opening degree A of the bypass valve 24 that reflects the engine speed N and the fuel injection volume F of the engine, the control section 33 can determine the opening degree A simply by comparing the detected values obtained from the detector 13 and the map M1. Therefore, as a result, the configuration of the control section 33 can be simplified further.

[2nd Embodiment]

Now, the second embodiment of the present invention will be described below. The second embodiment differs from the above-described first embodiment in terms of the detector 13 of the intake control device 40 of the diesel engine 1.

Figure 4:
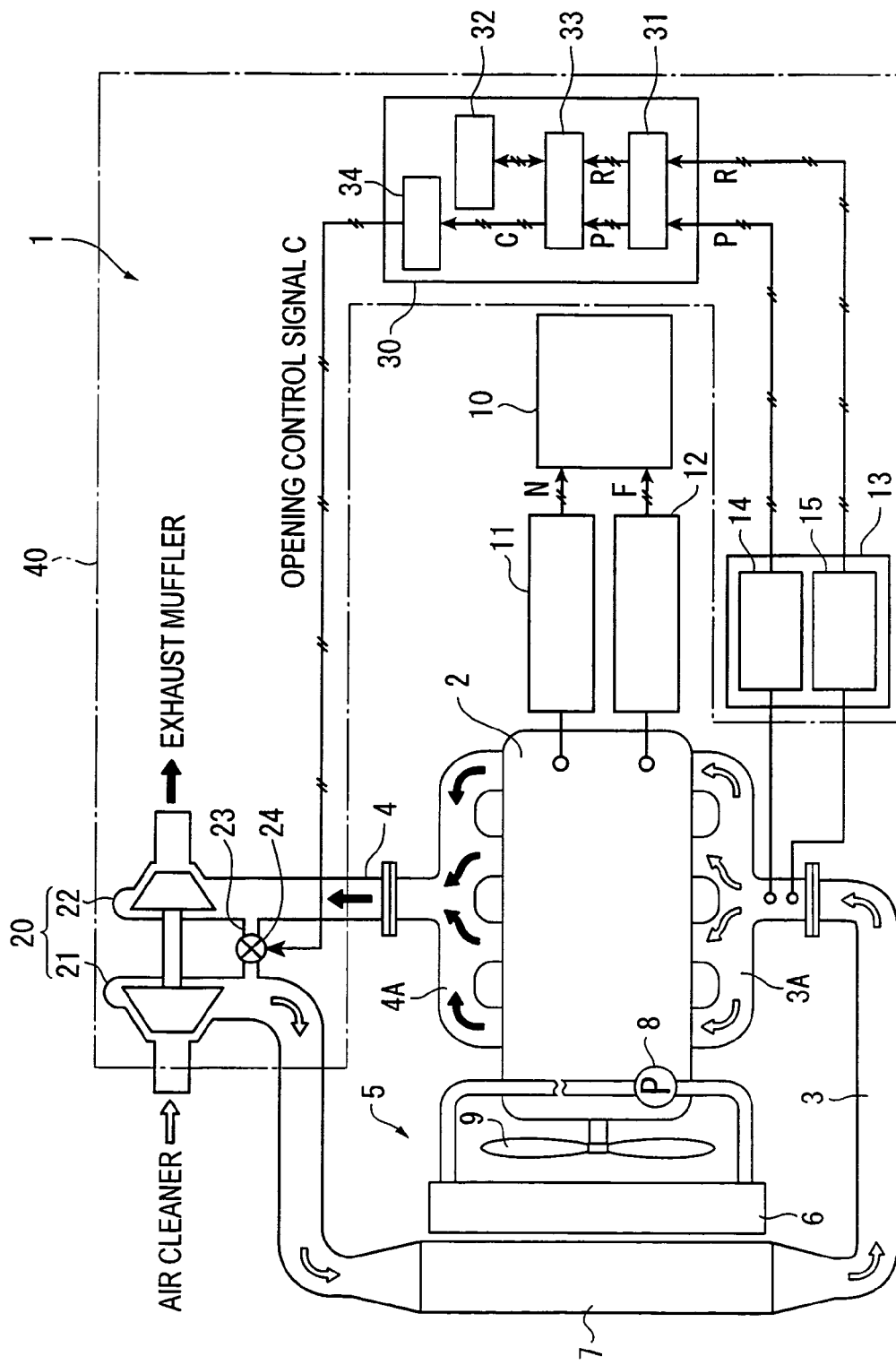
FIG. 4 is a schematic illustration of an internal combustion engine system according to a second embodiment of the present invention.

FIG. 4 is a schematic illustration of the system of a diesel engine 1 to which the second embodiment is applied. Referring to FIG. 4, the intake control device 40 has a detector 13 for detecting the operating condition of the diesel engine 1 that is a compressor operating condition detector including a charge pressure detector 14 for detecting the charge pressure P of the compressor 21 and a charge air flow rate detector 15 for detecting the charge air flow rate R of the compressor 21. Both the charge pressure detector 14 and the charge air flow rate detector 15 are fitted to the intake manifold 3A so that it can detect the charge pressure P and the charge air flow rate R of the compressor 21 by detecting the intake pressure and the intake flow rate of the engine main body 2 at the intake manifold 3A.

Figure 5:
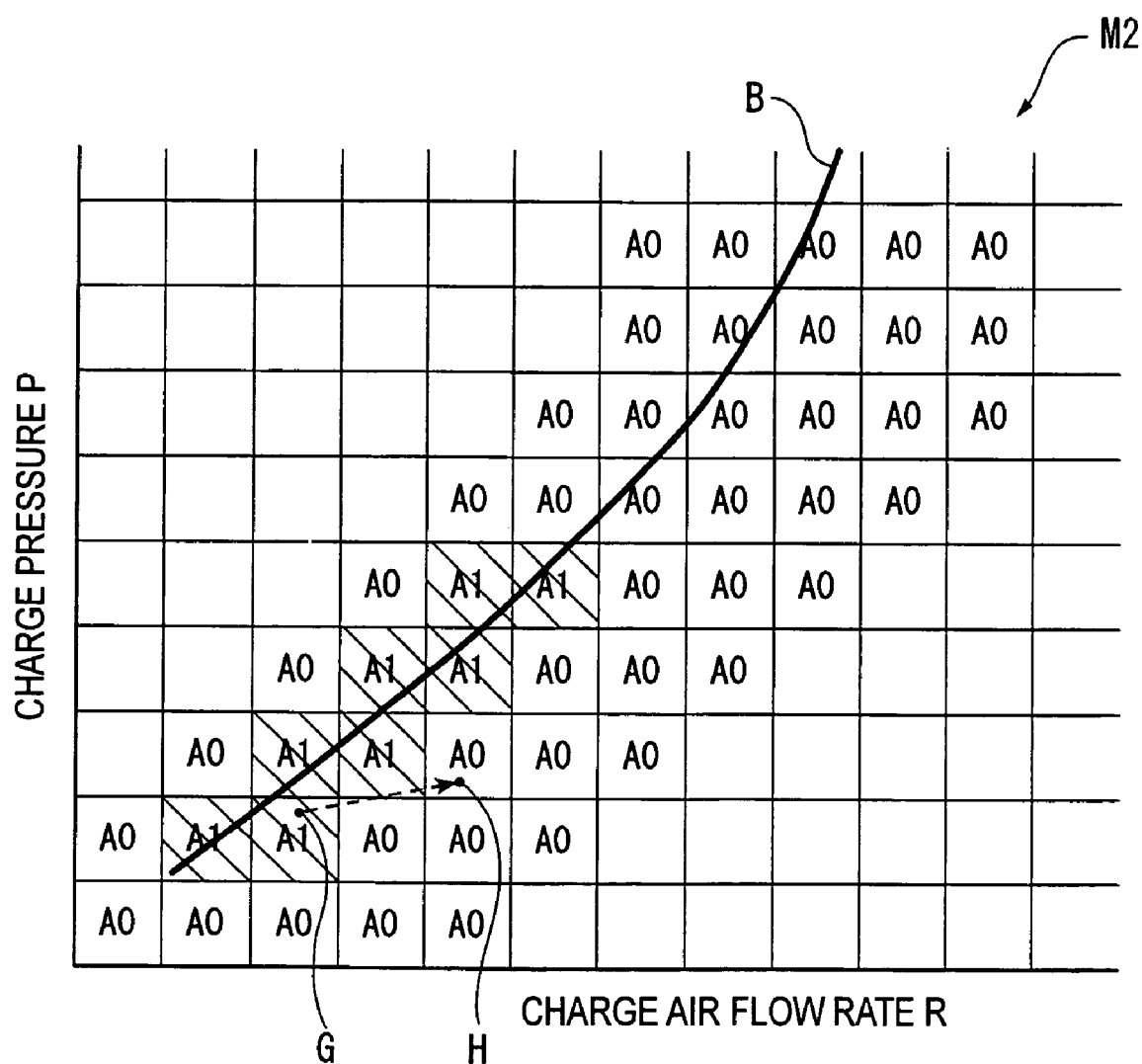
FIG. 5 is a schematic illustration of a map of a memory section of a bypass valve opening controller according to the second embodiment of the invention.
Figure 6:
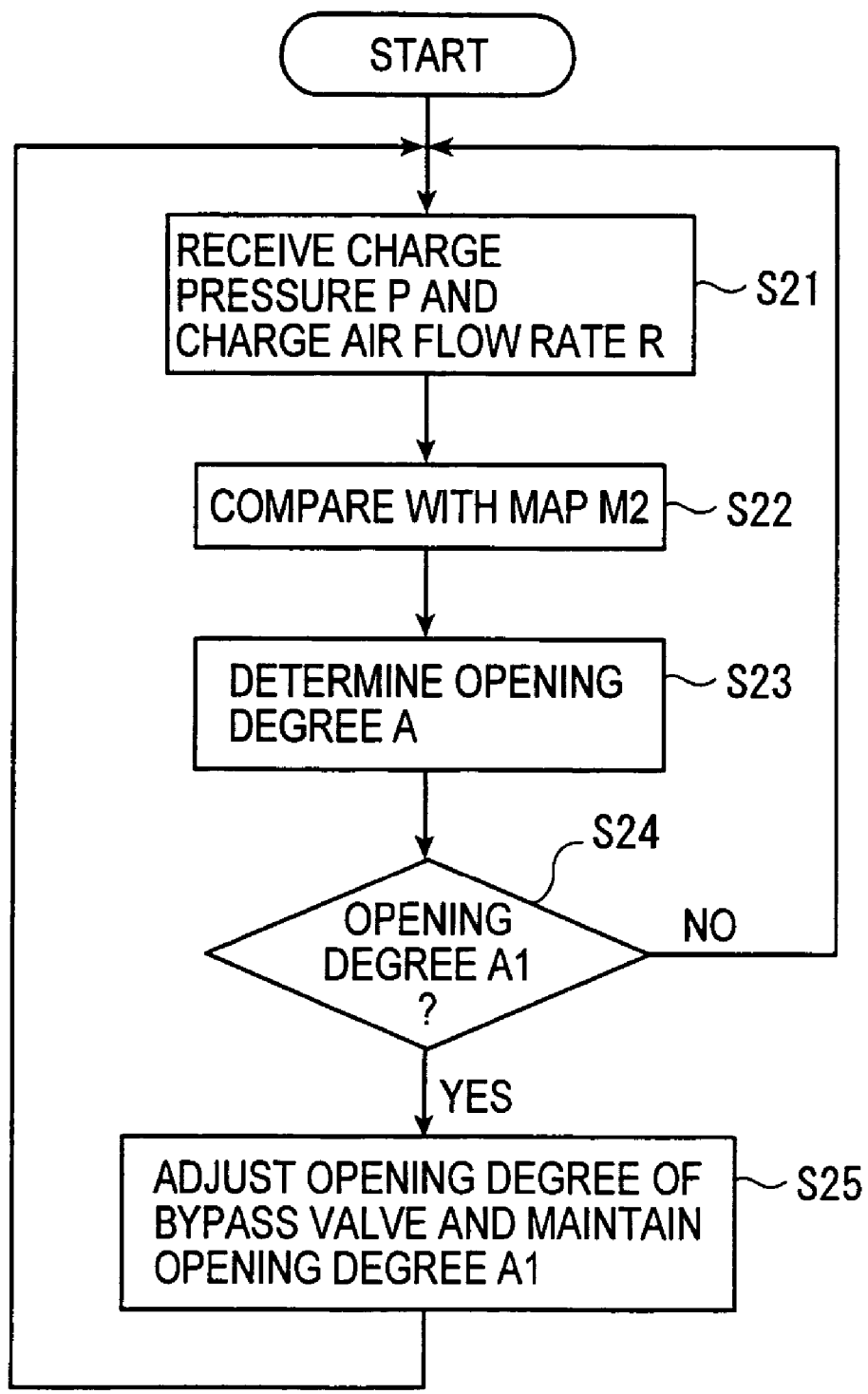
FIG. 6 is a flow chart of the operation of an intake bypass control device according to the second embodiment of the invention.

As shown in FIG. 5, the memory section 32 of the valve controller 30 stores a map M2 showing opening degree A of the bypass conduit 23 that reflects the operating condition of the diesel engine 1. The map M2 is formed by using a horizontal axis that represents the charge air flow rate R of the compressor 21 and a vertical axis that represents the charge pressure P to show the performance of the compressor 21 and the time period T during which the opening degree A of the bypass conduit 23 is maintained as a function of the operating condition of the diesel engine 1.

In FIG. 5, line B is the surging limit line that defines the surging range of the compressor 21. The area in FIG. 5 located at the lower charge air flow rate side and at the higher charge pressure side relative to the surging limit line B (the area located to the left of the surging limit line B) is the part of the surging range where the operation of the compressor 21 is unstable.

The opening degree A of the bypass conduit 23 is defined to be equal to A1, which represents a completely open state, in an area located close to the surging limit line B, where both the charge pressure P and the charge air flow rate R are relatively low, whereas it is defined to be equal to A0, which represents a completely closed state, in all the remaining area, where the diesel engine 1 operates at low speed with a high load for the compressor 21. As in the case of the first embodiment, the time period T during which the opening degree A1 is maintained is defined in advance to be equal to a predetermined value of T1.

Note that, while the vertical axis of an ordinary performance diagram of a compressor 21 showing the surging limit of the compressor 21 normally represents the pressure ratio of the inlet pressure (atmospheric pressure) to the outlet pressure, the pressure ratio is multiplied by the atmospheric pressure and shown in the map M2 as inlet pressure (charge pressure P). Of course, the vertical axis of the map M2 may be made to represent the pressure ratio and the control section 33 may be provided with a computing section so that the pressure ratio may be computationally determined from the charge pressure P and subsequently compared with the map M2.

In the intake control device 40 having the above described configuration, the valve controller 30 receives the detected value of the charge pressure P from the charge pressure detector 14 and the detected value of the charge air flow rate R from the charge air flow rate detector 15 (S21) and compares the received values with the map M2 stored in the memory section 32 of the control section 33 (S22) before it determines the opening degree A (S23). If the opening degree A of the bypass conduit 23 as selected on the map M2 is equal to A1, which represents a completely open state (Yes in the S24), the output section 34 outputs an opening adjusting signal C so that the bypass valve 24 completely opens the bypass conduit 23 and keeps the completely open state for the predetermined period of time T1 (S25).

Then, the charge air partly flows into the exhaust conduit 4 to raise the exhaust pressure. Then, the rotational speed of the exhaust turbine 22 is increased to raise the charge air flow rate of the compressor 21. As a result of completely opening the bypass conduit 23, the operation point of the compressor 21 is shifted from point G to point H in FIG. 5 to prevent the operation point of the compressor 21 from entering the surging range.

If, on the other hand, the opening degree A as selected on the map M2 is equal to A0, which represents a completely closed state, the output section 34 of the control section 33 outputs an opening non-adjusting signal so as to maintain the bypass valve 24 in the completely closed state. Alternatively, it may be so arranged that the output section 34 does not output any signal to the bypass valve 24 so that the bypass valve 24 and hence the bypass conduit 23 are held to the completely closed state.

The above described second embodiment provides the following advantages in addition to the advantages (1), (2) and (4) of the first embodiment.

(5) Since the memory section 32 stores a map M2 that defines the opening degree A of the bypass conduit 23 on a performance diagram showing the operating range of the compressor 21, the opening degree A of the bypass conduit 23 can be so selected relative to the operating range as to prevent the operating range of the compressor 21 from approaching the surging range. Therefore, the compressor 21 can be driven to operate on a stable basis without allowing the operation point of the compressor 21 to approach the surging range.

(6) Since the detector 13 is a compressor operating condition detector that includes a charge pressure detector 14 and a charge air flow rate detector 15, the values detected from the compressor 21 are directly taken in to accurately grasp the operating condition of the compressor 21 so that the compressor 21 is reliably prevented from approaching the surging range.

[3rd Embodiment]

Now, the third embodiment of the present invention will be described below. The third embodiment differs from the above-described first embodiment in terms of the detector 13.

Figure 7:
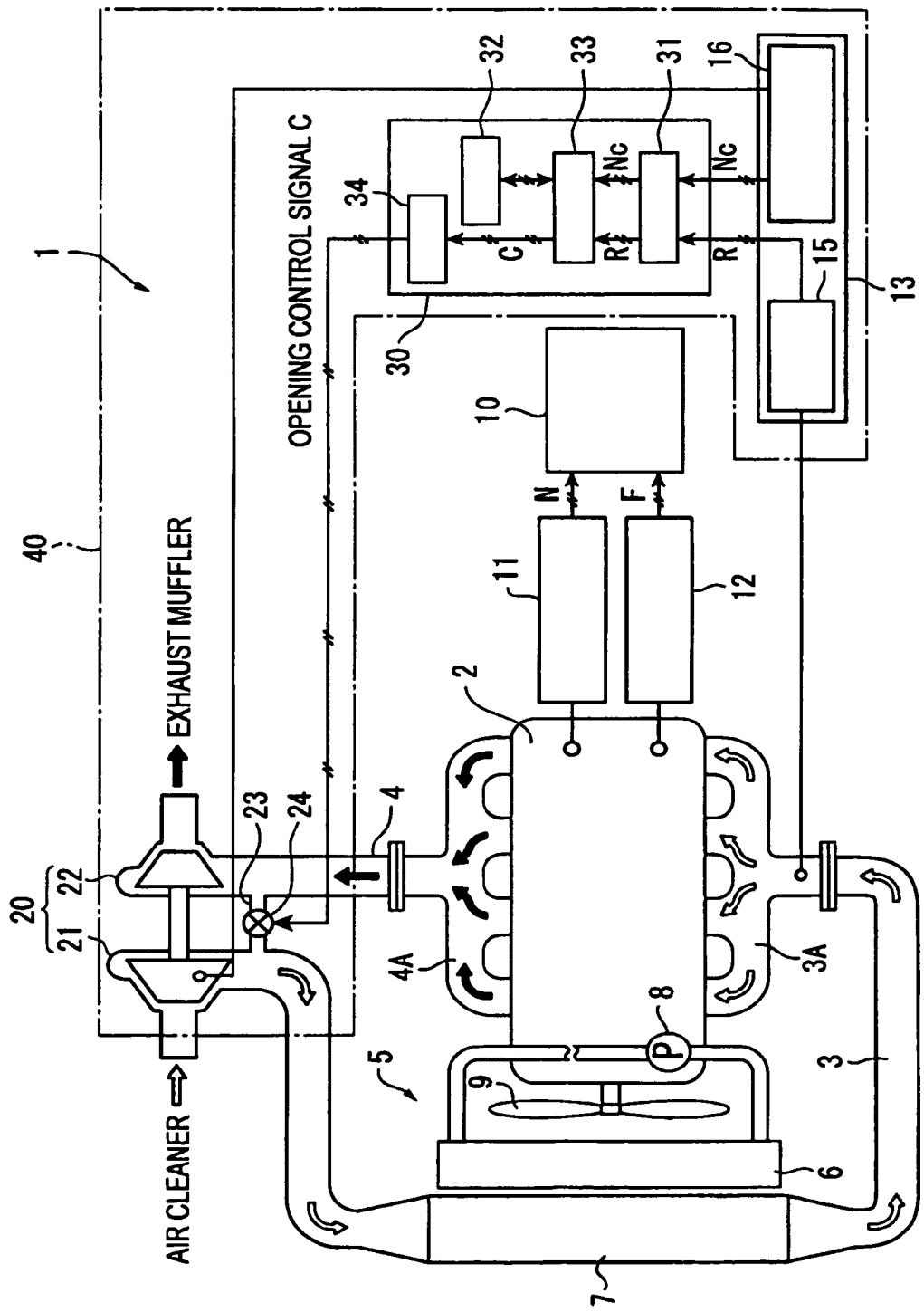
FIG. 7 is a schematic illustration of an internal combustion engine system according to a third embodiment of the present invention.

FIG. 7 is a schematic illustration of the system of a diesel engine 1 to which the third embodiment is applied. Referring to FIG. 7, the intake control device 40 has a detector 13 for detecting the operating condition of the diesel engine 1 that is a turbocharger operating condition detector and includes a charge air flow rate detector 15 for detecting the charge air flow rate R from the compressor 21 and a turbocharger rotational speed detector 16 for detecting the rotational speed Nc of the exhaust gas turbocharger 20.

As in the case of the second embodiment, the charge air flow rate detector 15 is fitted to the intake manifold 3A so that it can detect the charge air flow rate R of the compressor 21 by detecting the intake flow rate of the engine main body 2 at that part.

The turbocharger rotational speed detector 16 is arranged at the compressor 21 and may be adapted to detect the rotational speed Nc of the compressor 21 by detecting the passage of each of the rotary vanes of the compressor 21 or detect the rotational speed of the rotary shaft that links the exhaust turbine 22 and the compressor 21.

Figure 8:
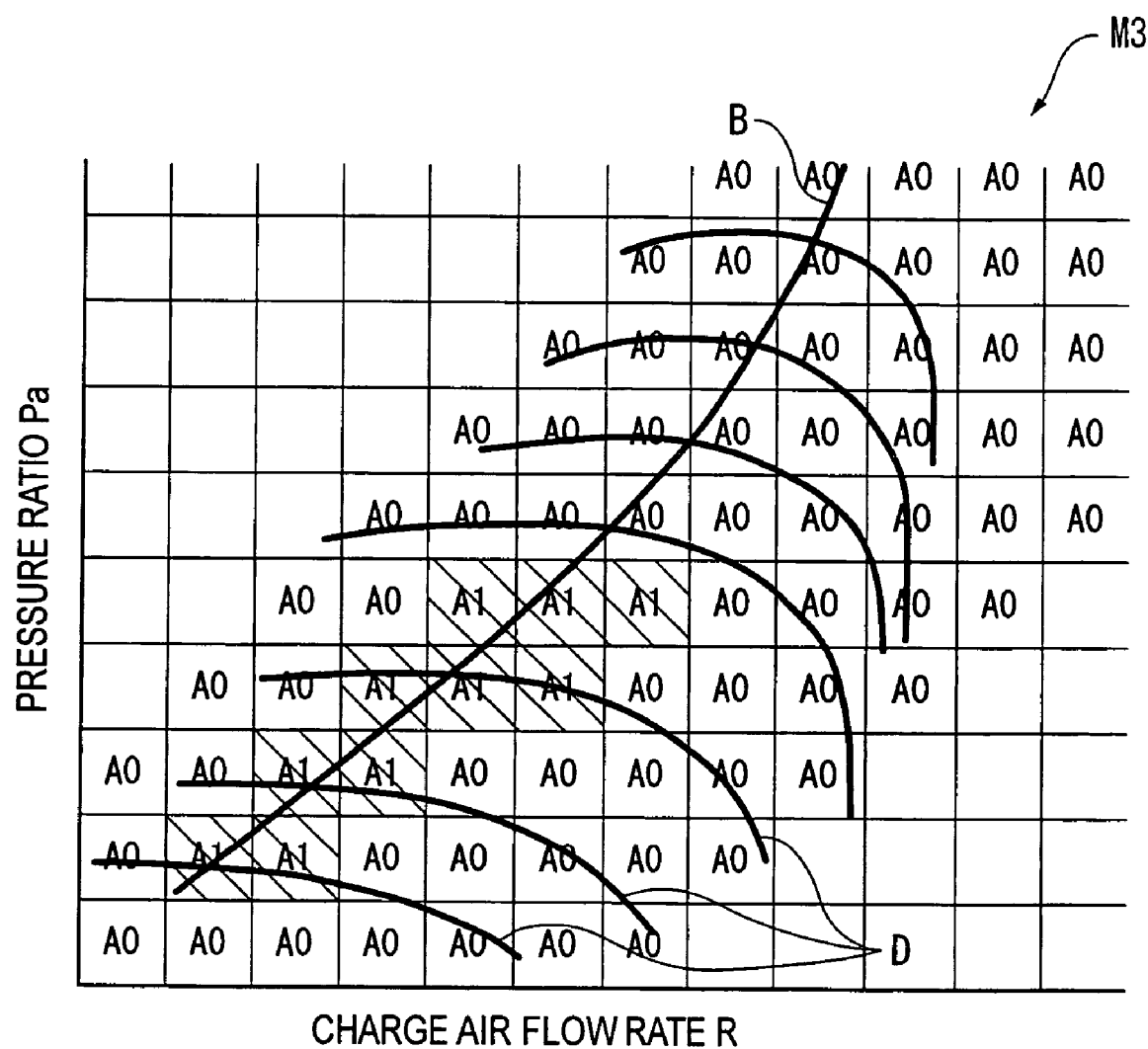
FIG. 8 is a schematic illustration of a map of a memory section of a bypass valve opening controller according to the third embodiment of the invention.

The memory section 32 of the valve controller 30 stores a map M3 as shown in FIG. 8. The map M3 is a performance diagram of the compressor 21 that is formed by using a horizontal axis that represents the charge air flow rate R of the compressor 21 and a vertical axis that represents the pressure ratio Pa of the inlet pressure (atmospheric pressure) to the outlet pressure of the compressor 21. In FIG. 8, lines D are constant rotational speed graphs of the compressor 21. As the speed of the diesel engine 1 falls, the rotational speed Nc of the compressor 21 also falls. As shown in FIG. 8, as the rotational speed Nc falls, the pressure ratio Pa of the compressor 21 also falls. It will be appreciated by seeing the graphs D that, when compressor 21 is operating at a constant rotational speed Nc, the operation point of the compressor 21 approaches the surging limit line B as the charge air flow rate R is reduced.

Thus, in the map M3, the opening degree A of the bypass conduit 23 is defined to be equal to A1, which represents a completely open state, in a region where the rotational speed Nc of the compressor 21 is low and the charge air flow rate R is also low (a low pressure ratio region in FIG. 8) and equal to A0, which represents a completely closed state, in all the remaining region. Additionally, the time period T during which the opening degree A1 is maintained is defined be equal to a predetermined value of T1 also in the third embodiment.

With the intake control device 40 of this embodiment, the control section 33 compares the detected values from the charge air flow rate detector 15 and the turbocharger rotational speed detector 16 with the map M3 to determine the opening degree A as in the case of the second embodiment. The bypass valve 24 is completely opened when A1 is selected for the opening degree A, whereas the bypass valve 24 is completely closed when A0 is selected for the opening degree A.

The above described third embodiment provides the following advantage in addition to the advantages (1), (2) and (4) of the first embodiment and the advantage (5) of the second embodiment.

(7) Since the detector 13 is a turbocharger detector that includes a charge air flow rate detector 15 and a turbocharger rotational speed detector 16, the operation point of the compressor 21 can be determined directly from the detected values so that the compressor 21 is reliably prevented from approaching the surging range as pointed out in the advantage (6) of the second embodiment.

The present invention is by no means limited to the above-described embodiments, which may be modified and/or altered in various different ways without departing from the scope of the invention.

For example, the bypass valve is a two-position control valve that keeps the bypass conduit selectively either in a completely open state or in a completely closed state in each of the above described embodiments, the present invention is by no means limited thereto. A bypass valve that can select a half-open state in addition to a completely open state and a completely closed state for the connecting passage may alternatively be provided so that the opening of the connecting passage can be so controlled as to take one of the three positions. Then, the opening degree of the connecting passage can be controlled more finely. Still alternatively, a bypass valve that can select four or more than four positions or a bypass valve whose opening degree is continuously variable may be used.

Figure 9:
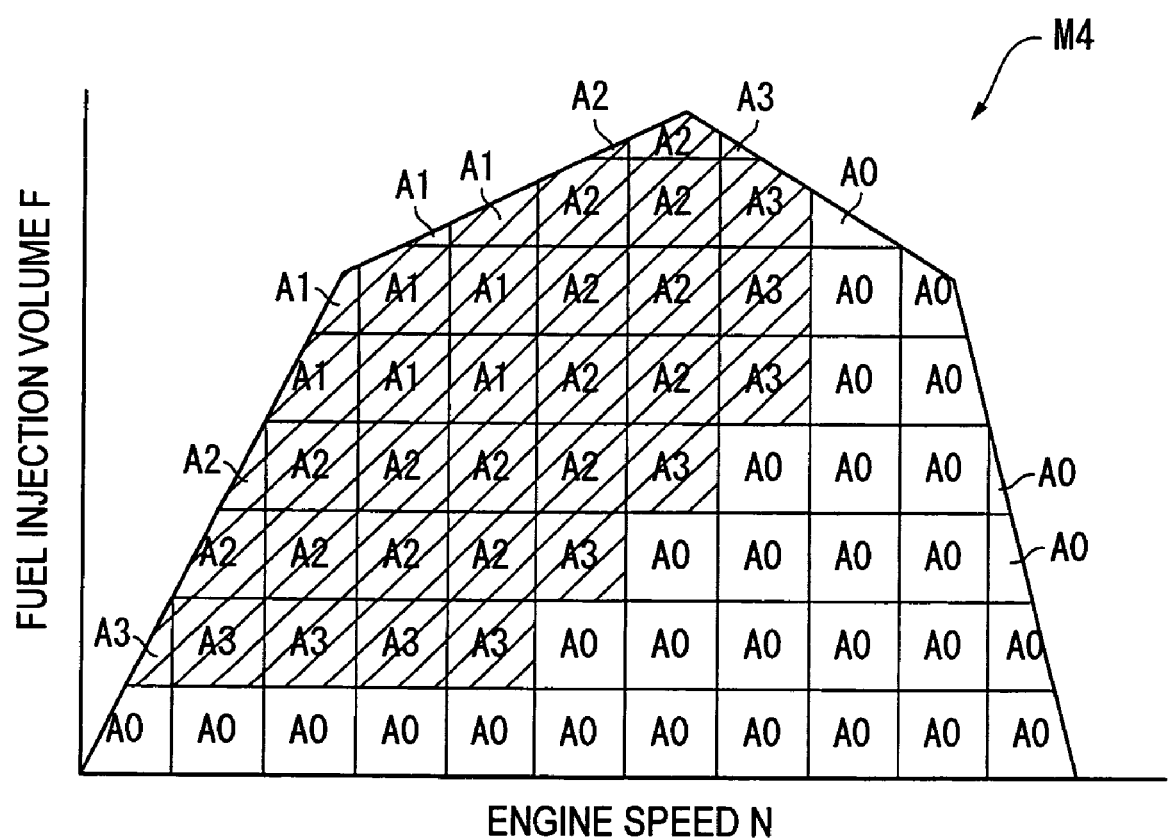
FIG. 9 is a schematic illustration of a modified map of the memory section of the bypass valve opening controller according to the present invention.
Figure 10:
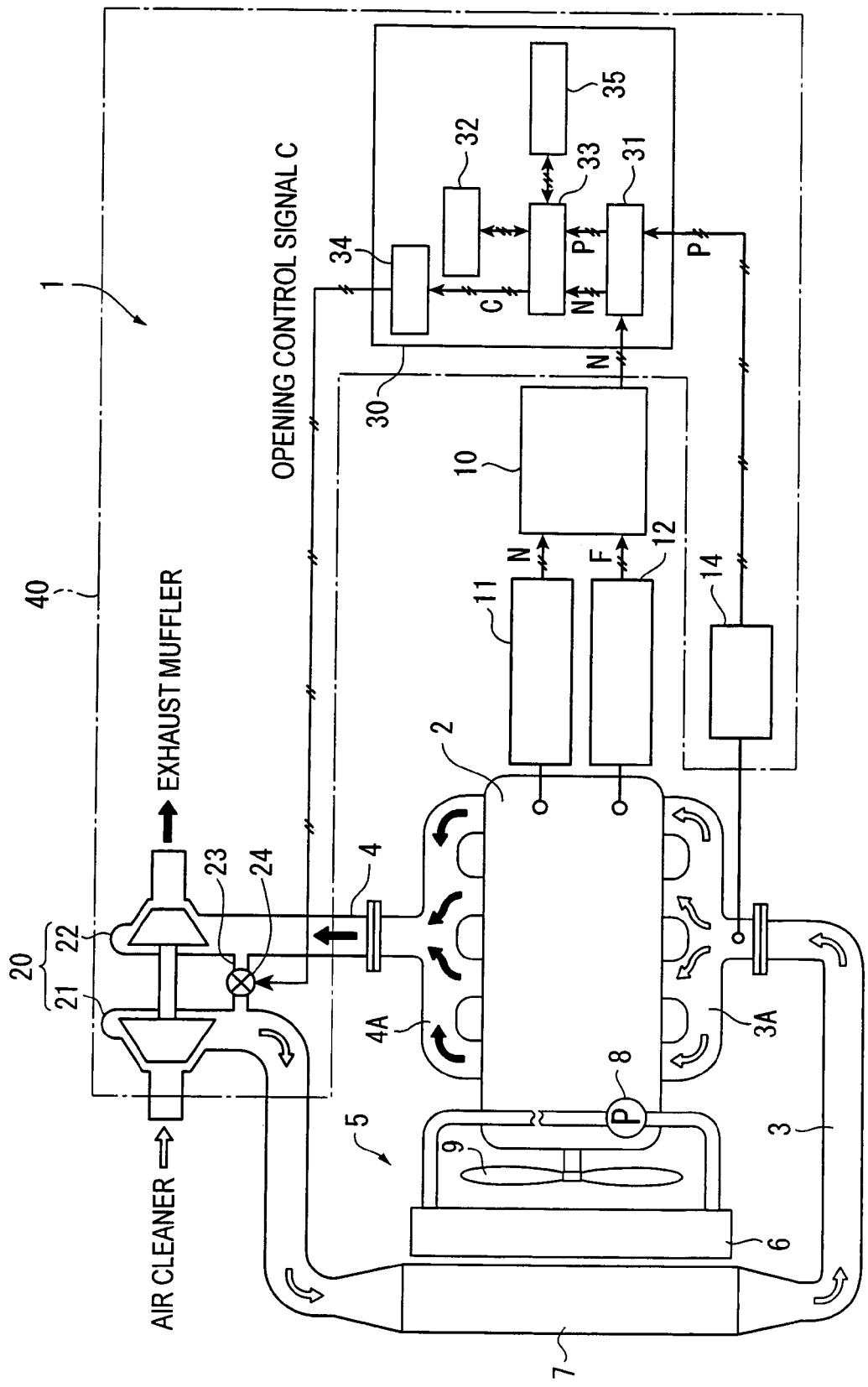
FIG. 10 is a schematic illustration of a modified internal combustion engine system according to the present invention.

When the opening degree of the connecting passage can be adjusted in a multiple steps or continuously, the opening degree of the connecting passage may be defined and stored in advance in the memory section so that any of them may be selected to reflect the detected operating condition of the internal combustion engine. For example, when a bypass valve 24 that can be adjusted in a multiple of steps is used in the first embodiment, it may be so arranged that the memory section 32 stores in advance a plurality of opening degrees for the bypass conduit 23 that can be selected relative to the fuel injection volume F and the engine speed N in the form of map M4 as shown in FIG. 9. In FIG. 9, four opening degrees A including A1 (100% or completely open), A2 (70%), A3 (50%) and A0 (0% or completely closed) may be provided.

The memory section may be so adapted as to store an arithmetic formula instead of a map or a table. Particularly, the intake bypass can be controlled more finely when the opening degree of the bypass valve is adjusted continuously.

A predetermined time period T1 is used for the time period during which the bypass valve is held open in each of the above described embodiments. However, the present invention is by no means limited thereto and the time period may be appropriately selected as a function of the operating condition of the internal combustion engine, for example. More specifically, for example, it may be so arranged that the memory section stores a number of time periods during which the connecting passage is held completely open so that a longer time period may be selected at the high-load side and both the opening degree and the time period during which the connecting passage is held open are controlled by a bypass valve opening controller.

The timing of opening the bypass valve and that of closing the bypass valve may not necessarily be stored in advance in the memory section in the form of a map or table. For example, it may alternatively be so arranged that the control section monitors the values representing the operating condition of the internal combustion engine that are detected by the operating condition detector and controls the timing of opening the bypass valve and that of closing the bypass valve. More specifically, it may be so arranged that the bypass valve is opened when the operating condition is found within a predetermined range and closed when the operating condition is found out of the predetermined range. With this control technique, it is not necessary to predefine the time period during which the bypass valve is held open so that the control operation will be simplified. Additionally, the control operation will be more reliable because the opening of the bypass valve can be controlled on a real time basis.

The opening degree of the bypass valve is not limited to completely open and completely closed and may alternatively and freely be defined in many different ways by taking the running range of the internal combustion engine, the dimensions of the connecting passage, the operating range of the turbocharger and other factors into consideration. Thus, it may be so arranged that the bypass valve is completely opened in a low-speed and high-load region and opened by 20% in a high speed region. Alternatively, it may be so arranged that the bypass valve is completely closed in a high speed region and opened by 50% in a low-speed and high-load region. In short, what is important is that the opening degree of the bypass valve is so controlled that the connecting passage is opened in a low-speed and high-load region of the operating condition of the internal combustion engine.

The operating condition detector of the second embodiment detects the charge air flow rate R and the charge pressure P of the compressor 21 at the intake manifold 3A. However, for the purpose of the present invention, detection of the charge air flow rate R and that of the charge pressure P are by no means limited thereto. For example, the charge air flow rate R may be determined by computing operations using the charge pressure P. Then, the valve controller 30 needs to be provided with a computing section 35 that computationally determines the pressure ratio and the charge air flow rate R of the compressor 21 from the charge pressure P and the engine speed N. The input section 31 receives the detected value of the charge pressure P from the charge pressure detector 14 and the detected value of the engine speed N from the engine speed detector 11. The computing section 35 computationally determines the pressure ratio of the compressor 21 from the charge pressure P. The section 35 then computationally determines the charge air flow rate R from the above pressure ratio and the detected engine speed N. The control section 33 determines the degree of operation A of the bypass conduit 23 by comparing the pressure ratio and the charge air flow rate R with the map.

The pressure ratio is not limited from the one that is computationally determined from the charge pressure P. Alternatively, it may be computationally determined from the charge temperature. The charge temperature may be obtained by directly using the value of the outlet temperature of the compressor or by modifying the value of the outlet temperature of the compressor, taking the effect of the after-cooler into consideration on the basis of the intake temperature as observed at the intake manifold.

While the engine speed N and the fuel injection volume F of the diesel engine 1 are detected through the engine controller 10 in the first embodiment, the signals from the detector 13 may alternatively and directly be input to the valve controller 30.

While the detector of any of the above described embodiments is adapted to detect the engine speed N and the fuel injection volume F or two of the charge air flow rate R, the charge pressure P and the compressor rotational speed Nc, the present invention is by no means limited thereto and any factor by which the operating condition of the diesel engine can be grasped such as the charge temperature may alternatively be used for the purpose of the invention.

Figure 11:
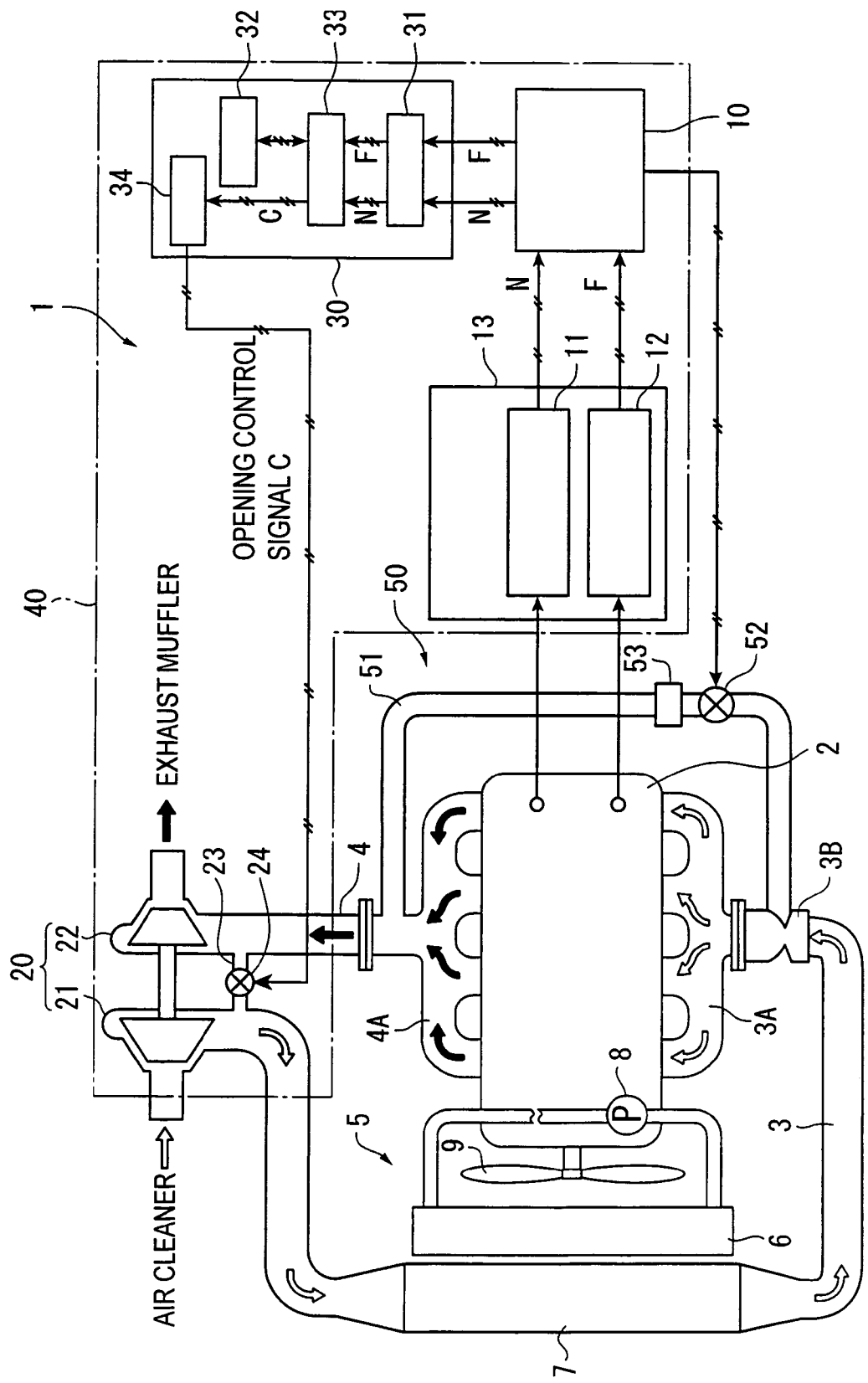
FIG. 11 is a schematic illustration of another modified internal combustion engine system according to the present invention.

The configuration of the diesel engine is not limited to those of the above described embodiments. For example, an exhaust gas recirculation system (EGR) 50 as shown in FIG. 11 may be provided. Referring to FIG. 11, the diesel engine 1 is provided with an EGR conduit 51 that connects the intake conduit 3 to the exhaust manifold 4A. The EGR conduit 51 is provided with an EGR valve 52 adapted to open and close the EGR conduit 51 and an EGR cooler 53 adapted to cool the exhaust from the exhaust manifold 4A. The EGR conduit 51 connects at the end close to the intake conduit 3 to a narrowed section of a venturi 3B that is arranged at the intake conduit 3.

When the operating condition of the diesel engine 1 is found in a low-speed and high-load region, an excellent EGR may not necessarily take place if the EGR conduit 51 is opened because the charge pressure normally becomes higher than the exhaust pressure. Conventional internal combustion engines that are provided with an EGR system are so adapted that the bypass circuit is opened for the purpose of improving the EGR efficiency when the intake pressure of the internal combustion engine is higher than the exhaust pressure so that the bypass circuit is opened in a medium-high speed and high-load region of the operating condition of the engine. Therefore, the bypass circuit is not opened in a low-speed and high-load region of the operating condition of the engine if the bypass circuit is controlled in a manner as described above so that the problems in the low-speed and high-load region remains unsolved.

To the contrary, with an intake control device 40 according to the present invention that is provided with a bypass conduit 23, the intake air partly flows into the exhaust conduit 4 to reduce the charge pressure so that an excellent EGR takes place to realize a high EGR ratio when the bypass conduit 23 is so controlled as to become open when the operating condition of the diesel engine 1 is found in a low-speed and high-load region.

The format of EGR is by no means limited to the above described one. For example, a bypass conduit connecting the inlet side to the outlet side of the venturi may be arranged to adjust the intake of air that passes through the venturi. Alternatively, no venturi may be provided.

For the purpose of the present invention, the internal combustion engine is not limited to a diesel engine and an internal combustion engine of any other type such as gasoline engine that requires supercharging may alternatively be used.

The best configuration and the best process for carrying out the present invention are described above. However, the present invention is by no means limited thereto. Namely, while the present invention is described and illustrated above by way of specific embodiments, it may be clear to those skilled in the art that the described and illustrated embodiments can be modified and/or altered in various different ways without departing from the scope and the general concept of the present invention particularly in terms of profile, material, quantity and so on.

Therefore, the particulars of the invention given above in terms of profile, material and so on are only exemplary ones and by no means limit the present invention. In other words, any parts of the specification that do not specifically refer to profile, material and so on are also found within the general concept of the present invention.

What is claimed is:

1. An internal combustion engine provided with an intake bypass control device, said engine comprising:
    a turbocharger including: (i) a compressor for taking in and pressurizing ambient air and supplying the pressurized air into the internal combustion engine, and (ii) an exhaust turbine for driving the compressor;
    a connecting passage for connecting an outlet passage of the compressor to an inlet passage of the exhaust turbine;
    a bypass valve arranged in the connecting passage;
    an operating condition detector for detecting an operating condition of the internal combustion engine; and
    a bypass valve opening controller adapted to open the bypass valve upon determining, in response to a signal from the operating condition detector, that the internal combustion engine is in a low-speed and high-load the operating condition;
    wherein the operating condition detector comprises a charge pressure detector for detecting a charge pressure of the turbocharger, and a charge air flow rate detector for detecting a charge air flow rate of the turbocharger, and
    wherein the bypass valve opening controller is adapted to open the bypass valve upon determining that one of: (i) the internal combustion engine is in the low-speed and high-load operating condition, and (ii) that an operating condition of the compressor is in a vicinity of a surging range based on the charge pressure detected by the charge pressure detector and the charge air flow rate detected by the charge air flow rate detector.

2. The internal combustion engine according to claim 1, wherein the bypass valve is adapted to adjust a valve opening thereof.

3. The internal combustion engine according to claim 2, wherein the operating condition detector comprises a turbocharger operating condition detector adapted to detect the operating condition of the turbocharger, and
    wherein the bypass valve opening controller is adapted to open the bypass valve upon determining that the operating condition of the compressor is in the vicinity of the surging range in response to a signal from the turbocharger operating condition detector.

4. The internal combustion engine according to claim 1, wherein the operating condition detector comprises a turbocharger operating condition detector adapted to detect the operating condition of the turbocharger, and
    wherein the bypass valve opening controller is adapted to open the bypass valve upon determining that the operating condition of the compressor is in the vicinity of the surging range in response to a signal from the turbocharger operating condition detector.

5. An internal combustion engine provided with an intake bypass control device, said engine comprising:
    a turbocharger including: (i) a compressor for taking in and pressurizing ambient air and supplying the pressurized air into the internal combustion engine, and (ii) an exhaust turbine for driving the compressor;
    a connecting passage for connecting an outlet passage of the compressor to an inlet passage of the exhaust turbine;
    a bypass valve arranged in the connecting passage;
    an operating condition detector for detecting an operating condition of the internal combustion engine; and
    a bypass valve opening controller adapted to open the bypass valve upon determining, in response to a signal from the operating condition detector, that the internal combustion engine is in a low-speed and high-load operating condition;
    wherein the operating condition detector comprises a turbocharger rotational speed detector for detecting a rotational speed of the turbocharger, and a charge air flow rate detector for detecting a charge air flow rate of the turbocharger, and
    wherein the bypass valve opening controller is adapted to open the bypass valve upon determining that one of: (i) the internal combustion engine is in the low-speed and high-load operating condition, and (ii) that an operating condition of the compressor is in a vicinity of a surging range based on the turbocharger rotational speed detected by the turbocharger rotational speed detector and the charge air flow rate detected by the charge air flow rate detector.

6. The internal combustion engine according to claim 5, wherein the bypass valve is adapted to adjust a valve opening thereof.

7. The internal combustion engine according to claim 6, wherein the operating condition detector comprises a turbocharger operating condition detector adapted to detect the operating condition of the turbocharger, and
    wherein the bypass valve opening controller is adapted to open the bypass valve upon determining that the operating condition of the compressor is in the vicinity of the surging range in response to a signal from the turbocharger operating condition detector.

8. The internal combustion engine according to claim 5, wherein the operating condition detector comprises a turbocharger operating condition detector adapted to detect the operating condition of the turbocharger, and
    wherein the bypass valve opening controller is adapted to open the bypass valve upon determining that the operating condition of the compressor is in the vicinity of the surging range in response to a signal from the turbocharger operating condition detector.

* * * * *